United States Patent
Guo et al.

(10) Patent No.: US 10,732,749 B2
(45) Date of Patent: Aug. 4, 2020

(54) ARRAY SUBSTRATE AND EMBEDDED-TYPE TOUCH DISPLAY SCREEN

(71) Applicant: Wuhan China Star Optoelectronics Technology Co., Ltd., Wuhan, Hubei (CN)

(72) Inventors: Yunlong Guo, Guangdong (CN); Gonghua Zou, Guangdong (CN)

(73) Assignee: Wuhan China Star Optoelectronics Technology Co., Ltd., Wuhan (CN)

(*) Notice: Subject to any disclaimer, the term of this patent is extended or adjusted under 35 U.S.C. 154(b) by 0 days.

(21) Appl. No.: 16/214,354

(22) Filed: Dec. 10, 2018

(65) Prior Publication Data

US 2019/0361554 A1    Nov. 28, 2019

Related U.S. Application Data

(63) Continuation of application No. PCT/CN2018/101641, filed on Aug. 22, 2018.

(30) Foreign Application Priority Data

May 28, 2018    (CN) .......................... 2018 1 0523890

(51) Int. Cl.
*G09G 3/30*    (2006.01)
*G09G 3/36*    (2006.01)
*G06F 3/041*    (2006.01)

(52) U.S. Cl.
CPC .......... *G06F 3/0412* (2013.01); *G06F 3/0416* (2013.01)

(58) Field of Classification Search
CPC ....................................................... G06F 3/044
See application file for complete search history.

(56) References Cited

U.S. PATENT DOCUMENTS

| | | | |
|---|---|---|---|
| 2012/0218199 A1* | 8/2012 | Kim ...................... | G06F 3/0412 345/173 |
| 2016/0291753 A1 | 10/2016 | Cao et al. | |
| 2019/0332241 A1* | 10/2019 | Wang ..................... | G06F 3/0418 |

FOREIGN PATENT DOCUMENTS

| | | |
|---|---|---|
| CN | 107357467 A | 11/2017 |
| CN | 107589870 A | 1/2018 |
| KR | 20170081092 A | 7/2017 |

* cited by examiner

*Primary Examiner* — Sanghyuk Park

(57) ABSTRACT

An array substrate and a touch display screen are disclosed in the present disclosure. The array substrate includes a plurality of touch cells, a plurality of touch lines, a first control unit, and a second control unit. Through this way, the present disclosure can solve the problem that touch lines fail to uniformly drive touch cells in each column due to the fact that the number of touch cells in the longitudinal direction is out of proportion with the number of pixel cells in the horizontal direction of each touch cell.

16 Claims, 4 Drawing Sheets

ARRAY SUBSTRATE AND EMBEDDED-TYPE TOUCH DISPLAY SCREEN

CROSS REFERENCE TO RELATED APPLICATIONS

The present application is a continuation-application of International (PCT) Patent Application No. PCT/CN2018/101641, filed on Aug. 22, 2018, which claims foreign priority of Chinese Patent Application No. 201810523890.2, filed on May 28, 2018 in the State Intellectual Property Office of China, the entire contents of which are hereby incorporated by reference.

TECHNICAL FIELD

The present disclosure relates to the touch display field, in particular to an array substrate and a touch display screen.

BACKGROUND

In recent years, the rapid development and popularization of smart phones to the mass have led to fierce competition among mobile phone manufactures and higher and higher requirements for the performance of display screens, and for this reason, it is extremely urgent for panel manufactures to optimize and improve existing display screens. As for the touch technique of display screens, common touch display panels on the present market are generally of an add-on type or an embedded type. Embedded-type touch display screens include in-cell touch display screens and on-cell touch display screens. Wherein, with the characteristics being light, thin, high in transmittance and simple in laminating process, the in-cell touch display screens stand out from the three types of touch display screens and are very popular with consumers, thereby having become the mainstream on the market. With the diversified development on the actual market, there have been requirements for in-cell touch display screens with many special resolutions, for instance, small-sized (smaller than 7") display screens with special resolutions (18:9/19:9/20:9/21:9 and the like), display screens adopting the special Notch design, and embedded-type touch display screens with medium and large sizes (over 7", vehicle-mounted, flat-panel and the like).

Under the limitations of touch sensitivity and anti-jamming capacity, the size of touch cells in the embedded-type touch display screens ranges from 3 mm*3 mm to 5 mm*5 mm. Under the condition where the size of the touch cells is known, the number of corresponding pixel cells in the horizontal direction of each touch cell and the number of corresponding pixel cells in the longitudinal direction of each touch cell are also basically determined. Furthermore, the number of the touch cells in the horizontal direction and the number of the touch cells in the longitudinal direction can also be determined according to the known resolution. Wherein, when the embedded-type touch screens have special resolutions, the number of the touch cells in the longitudinal direction may be out of proportion with the number of the pixel cells in the horizontal direction of each touch cell, and by the fact that the number of touch lines of the touch cells in each column is equal to the number of the touch cells in the longitudinal direction, the touch lines cannot be uniformly distributed to the touch cells in each column, consequentially, causing non-uniformity in linearity and sensitivity of the touch function and different display effects at the boundaries of the touch cells. For instance, when a touch display screen has a resolution of 1200 RGB*1920 and the number of the pixel cells corresponding to each touch cell is 40 RGB*40, the number of the touch cells in the horizontal direction of the touch display screen is 30, and the number of the touch cells in the longitudinal direction of the touch display screen is 48, that is to say, the number of the touch lines of the touch cells in each column is 48, while the number of the pixel cells in the horizontal direction of each touch cell is 40, and consequentially, the 48 touch lines cannot be uniformly distributed to the 40 pixel cells, in other words, the 48 touch lines cannot be uniformly distributed to the touch cells in each column.

As for small-sized embedded-type touch display screens encountering such problems, part of dually-arrayed touch lines can be separated into independent touch lines. Particularly, as shown in FIG. 1, when the number of the touch cells in the longitudinal direction is small and is in proportion with the number of the pixel cells in the horizontal direction of each touch cell (the number of the touch cells in the longitudinal direction is in proportion with the number of the pixel cells in the horizontal direction of each touch cell means that the number of the touch cells in the longitudinal direction is half, one third, the same, twice or the like of that of the pixel cells in the horizontal direction of each touch cell), dually-arrayed touch lines are used to control the touch cells. "Dually-arrayed" means that each pixel corresponds to two metal lines in parallel connection (namely two metal lines are used to control each touch cell), and the two metal lines are connected to a touch display integrated chip after being connected in parallel. By adoption of such line arrangement manner, the line impedance can be reduced, thus, avoiding impedance inconsistency between the near end and the far end of the touch display integrated chip. When the number of the touch cells in the longitudinal direction is out of proportion with the pixel cells in the horizontal direction of each touch cell, touch lines are dually and independently arrayed alternately to control the touch cells, wherein "independently-arrayed" means that each pixel corresponds to two independent metal lines, and in other words, two independent metal lines are used to control two touch cells and are respectively connected to a touch display integrated chip. For instance, when 48 touch lines are to be distributed to 40 pixel cells, 32 pixel cells of the 40 pixel cells can adopt dually-arrayed touch lines to control the corresponding touch cells, the other 8 pixel cells adopt independently-arrayed touch lines to control the corresponding touch cells, and in this way, the total number of the touch lines is 32+8*2, namely 48. By adoption of such line arrangement manner, in terms of RC evaluation, the independently-arrayed touch lines have to be disposed at the near end of the touch display integrated chip to minimize the impedance influence. However, in this case, the alternate arrangement manner of the touch lines may cause non-uniform RC loading, consequentially, affecting the display effect and the touch effect.

If the special Notch design is adopted for small-sized embedded-type touch display screens, the number of independently-arrayed touch lines needs to be increased, which will further worsen the impedance inconsistency and display non-uniformity.

If the small-sized embedded-type touch display screens are transformed into large-sized embedded-type touch display screens, the number of the touch cells in the longitudinal direction will be increased, and in this case, the number of the dually-arrayed touch lines cannot reach the number of the touch cells in the longitudinal direction. If the dually-arrayed touch lines are separated into independent touch lines, a large number of touch lines will be redundant, the number of channels of the touch display integrated chip will be increased by the redundant touch lines connected to the touch display integrated chip, and lines in the fan-out area are too dense, resulting in high risks in the manufacturing process.

In addition, as shown in FIG. 2, an array substrate of the traditional embedded-type touch display screens adopts the traditional 14-mask design. Particularly, the array substrate 100' comprises a substrate 21', metal blocks 22', a buffer layer 23', a poly-silicon layer 24', a gate insulation layer 25', a gate 26', a first insulation interlayer 27', a source/drain 28', a planarization layer 29', a second insulation interlayer 30', touch lines 31', a third insulation interlayer 32', a transparent electrode layer 33', a passivation layer 34' and a pixel electrode layer 35'.

Wherein, a first metal layer M1 serves as a gate layer, a second metal layer M2 serves as a source/drain line layer, and a third metal layer M3 serves as a touch line layer. As the touch lines are arrayed in an independent layer and occupy two marks correspondingly formed on the touch lines 31' and the third insulation interlayer 32', and thus, the process is complex, and the material cost is high.

SUMMARY

The main technical issue to be settled by the present disclosure is to provide an array substrate and a touch display screen to solve the problem that touch lines fail to uniformly drive touch cells in each column due to the fact that the number of touch cells in the longitudinal direction is out of proportion with the number of pixel cells in the horizontal direction of each touch cell.

In order to solve the above technical problem, one technical solution adopted by the present disclosure is to provide an array substrate, wherein the array substrate comprises: a plurality of touch cells arrayed in a matrix manner, wherein each touch cell comprises a plurality of pixel cells arrayed in a matrix manner, and each pixel cell comprises a plurality of sub-pixels; a plurality of touch lines, and each touch line disposed in correspondence with a sub-pixel in a different column, wherein part of the touch lines are first touch lines, and a rest of the touch lines are second touch lines; a first control unit, wherein the first control unit comprises a plurality of first control terminals, and each first control terminal is electrically connected to a corresponding first touch line; a second control unit, wherein the second control unit comprises a second control terminal, and the second control terminal is electrically connected to a plurality of second touch lines; wherein, the first touch lines and the second touch lines are located on a same metal layer; wherein, the array substrate further comprises a metal line closed and disposed outside an active area, and the metal line is electrically connected to the second control unit; wherein, each second touch line is in short connection with the metal line and then is electrically connected to the second control unit through the metal line.

In order to solve the above technical problem, another technical solution adopted by the present disclosure is to provide an array substrate, wherein the array substrate comprises: a plurality of touch cells arrayed in a matrix manner, wherein each touch cell comprises a plurality of pixel cells arrayed in a matrix manner, and each pixel cell comprises a plurality of sub-pixels; a plurality of touch lines, and each touch line is disposed in correspondence with a sub-pixel in a different column, wherein part of the touch lines are first touch lines, and the rest of the touch lines are second touch lines; a first control unit, wherein the first control unit comprises a plurality of first control terminals, and each said first control terminal is electrically connected to a corresponding first touch line; and a second control unit, wherein the second control unit comprises a second control terminal, and the second control terminal is electrically connected to a plurality of second touch lines.

In order to solve the above technical problem, still another technical solution adopted by the present disclosure is to provide A touch display screen, wherein the touch display screen comprises an array substrate, and the array substrate comprises: a plurality of touch cells arrayed in a matrix manner, wherein each touch cell comprises a plurality of pixel cells arrayed in a matrix manner, and each pixel cell comprises a plurality of sub-pixels; a plurality of touch lines, and each touch line is disposed in correspondence with a sub-pixel in a different column, wherein part of the touch lines are first touch lines, and the rest of the touch lines are second touch lines; a first control unit, wherein the first control unit comprises a plurality of first control terminals, and each said first control terminal is electrically connected to a corresponding first touch line; and a second control unit, wherein the second control unit comprises a second control terminal, and the second control terminal is electrically connected to a plurality of second touch lines.

The present disclosure has the following beneficial effects: the array substrate and touch display screen include a plurality of touch cells arrayed in a matrix manner, a plurality of touch lines, a first control unit and a second control unit, wherein each touch cell includes a plurality of pixel cells arrayed in a matrix manner, and each pixel cell includes a plurality of sub-pixels; each touch line is disposed in correspondence with a sub-pixel in a different column, part of the touch lines are first touch lines, and the rest of the touch lines are second touch lines; the first control unit includes a plurality of first control terminals, and each first control terminal is electrically connected to a corresponding first touch line; and the second control unit includes a second control terminal, and the second control terminal is electrically connected to the plurality of second touch lines. Through the plurality of added second touch lines, the problem that the touch lines cannot uniformly drive the touch cells in each column due to the fact that the number of the touch cells in the longitudinal direction is out of proportion with the number of the pixel cells in the horizontal direction in each touch cell is solved.

DETAILED DESCRIPTION

A clear and complete description of the technical solutions provided by embodiments of the present disclosure is given below with reference to the accompanying drawings. Apparently, the embodiments described below are only several illustrative ones, but do not include all possible embodiments of the present disclosure. All other embodiments obtained by those ordinarily skilled in this field based on these illustrative embodiments without creative labor should also fall within the protection scope of the present disclosure.

Figure 1:
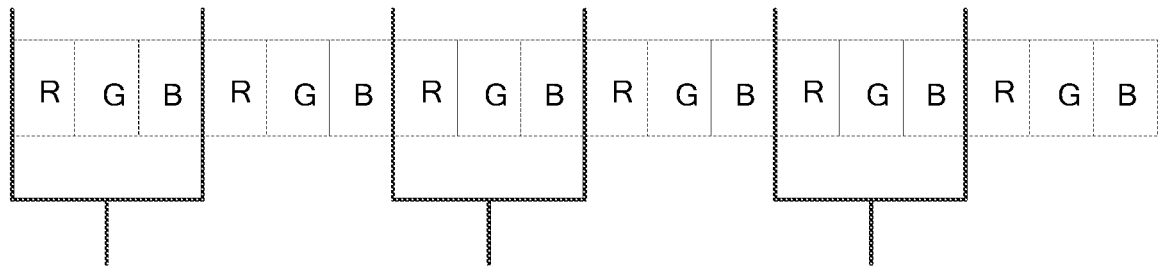
FIG. 1 is a schematic view of dually-arrayed touch lines in the related art.
Figure 2:
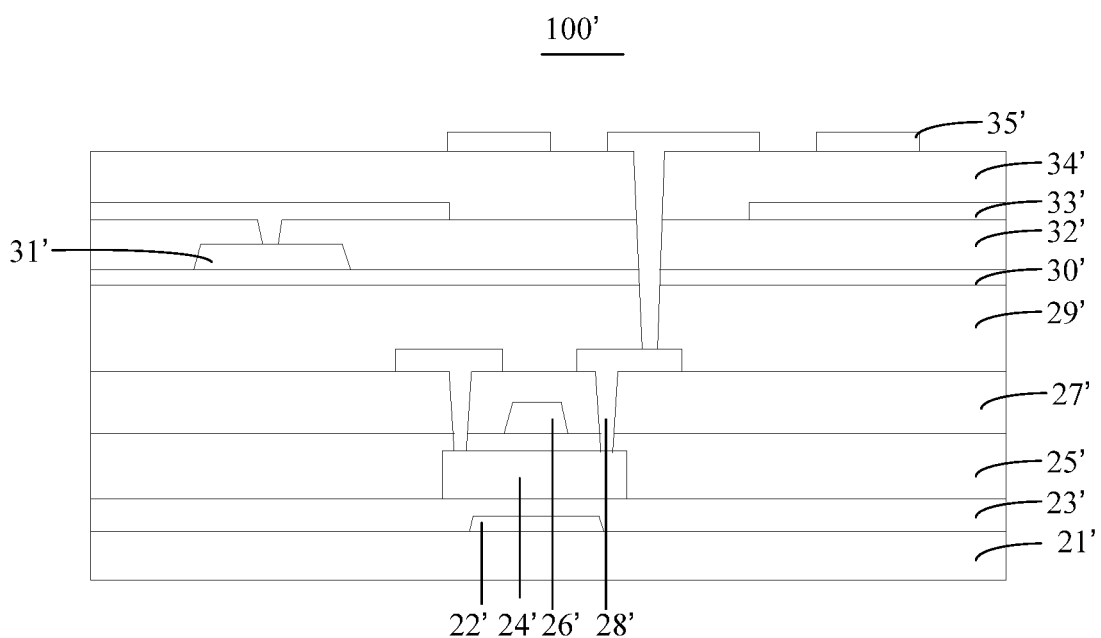
FIG. 2 is a partial cross-sectional schematic view of an array substrate in the related art.
Figure 3:
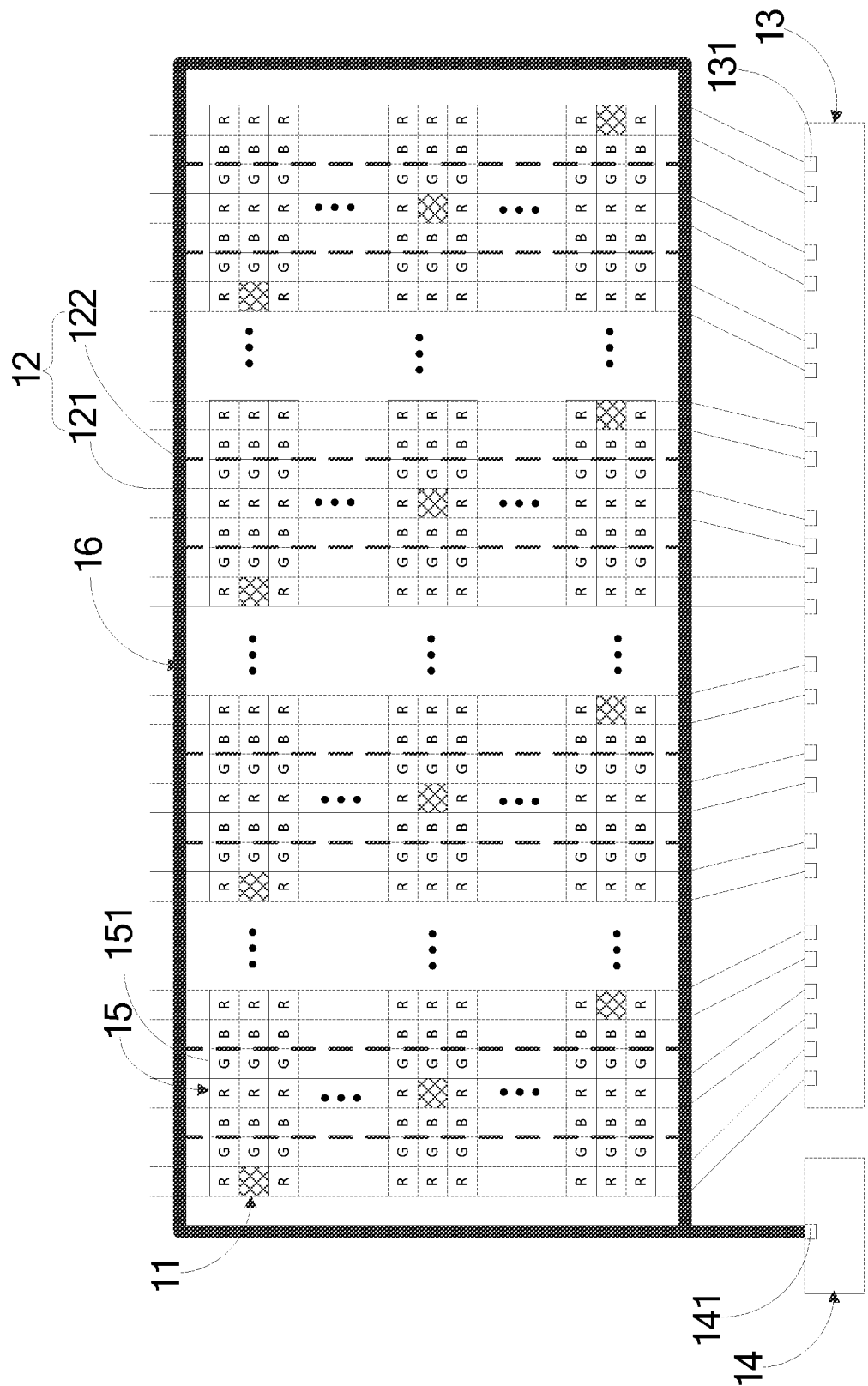
FIG. 3 is a schematic view of an array substrate in one embodiment of the present disclosure.

FIG. 3 is a schematic view of an array substrate in one embodiment of the present disclosure. As shown in FIG. 3, the array substrate 100 may include a plurality of touch cells 11, a plurality of touch lines 12, a first control unit 13 and a second control unit 14.

The plurality of touch cells 11 can be arrayed in a matrix manner. Each touch cell 11 may include a plurality of pixel cells 15 arrayed in a matrix manner. Each pixel cell 15 may include a plurality of sub-pixels 151. In this embodiment, each pixel cell 15 can include three sub-pixels 151 which are respectively a sub-pixel R, a sub-pixel G and a sub-pixel B.

Each touch line 12 can be disposed in correspondence with a sub-pixel 151 in a different column, wherein part of the touch lines 12 are first touch lines 121, and the rest of the touch lines 12 are second touch lines 122.

The first control unit 13 may include a plurality of first control terminals 131. Each first control terminal 131 may include electrically connected to a corresponding first touch line 121 and be used to provide a normal touch signal for the corresponding first touch line 121.

The second control unit 14 may include a second control terminal 141. The second control terminal 141 can be electrically connected to the plurality of second touch lines 122 and used to provide a virtual touch signal or a common level signal for the plurality of second touch lines 122.

In this embodiment, the array substrate 100 can further include a metal line 16 closed and disposed outside an active area, wherein the metal line 16 can be electrically connected to the second control unit 14. Each second touch line 122 can be in short connection with the metal line 16 and then electrically connected to the second control unit 14.

In this embodiment, the plurality of first touch lines 121 and the plurality of second touch lines 122 may be located on a same metal layer, and the metal line 16 and the plurality of second touch lines 122 can be located on different metal layers.

Figure 4:
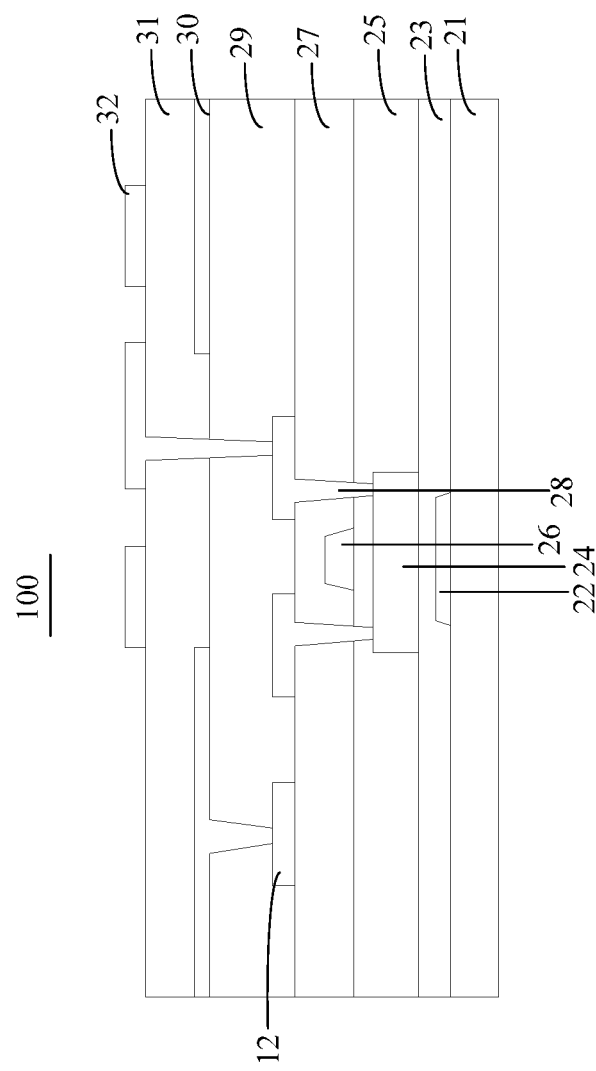
FIG. 4 is a partial cross-sectional schematic view of the array substrate shown in FIG. 3.

Particularly, please refer to FIG. 4 which is a partial cross-sectional schematic view of the array substrate shown in FIG. 3. As shown in FIG. 4, the array substrate 100 may include a substrate 21, a plurality of metal blocks 22 disposed on the substrate 21, a buffer layer 23 disposed on the metal blocks 22 and the substrate 21, a poly-silicon layer 24 disposed on the buffer layer 23, a gate insulation layer 25 disposed on the poly-silicon layer 24 and the buffer layer 23, a gate 26 disposed on the gate insulation layer 25, and an insulation interlayer 27 disposed between the gate 26 and the gate insulation layer 25.

A source/drain 28 and the touch lines 12 may be disposed on the insulation interlayer 27. The source/drain 28 may penetrate through the whole insulation interlayer 27 to be connected to the poly-silicon layer 24 via the gate insulation layer 25. Meanwhile, the touch lines 12 insulated from the source/drain 28 can also be disposed on the insulation interlayer 27. In an actual manufacturing process, the source/drain 28 and the touch lines 12 may adopt a same mask process and be made from same material such as molybdenum, aluminum, or copper, but perform different effects and functions.

A planarization layer 29 may be disposed on the source/drain 28, the touch lines 12 and the insulation interlayer 27, and a transparent electrode layer 30 may be disposed on the planarization layer 29. Wherein, the transparent electrode layer 30 may penetrate through the planarization layer 29 to be connected to the touch lines 12.

A passivation layer 31 may be disposed on the transparent electrode layer 30, and a pixel electrode 32 can be disposed on the passivation layer 31 and penetrates through the passivation layer 31 and the planarization layer 29 to be connected to a drain in the source/drain 28.

In this embodiment, the plurality of touch lines 12 may include the first touch lines 121 and the second touch lines 122, that is to say, the first touch lines 121 and the second touch lines 122 can be located on the same layer with the source/drain 28 of the array substrate 100, which means that the first touch lines 121 and the second touch lines 122 can be located on a second metal layer M2. Meanwhile, the first touch lines 121 may be separated and insulated from the second touch lines 122. As the metal line 16 and the second touch lines 122 can be located on different metal layers, the metal line 16 can be located on a first metal layer M1 (namely, the metal line 16 and the gate 26 are located on a same layer), the transparent electrode layer 30, the pixel electrode layer 32 or the like except the second metal layer M2. Each second touch line 122 may be in short connection with the metal line 16 through a corresponding via hole.

In addition, the array substrate 100 in this embodiment can adopt a 9-mask design. As for the 9-mask design, a third metal layer, a second insulation interlayer, a third insulation interlayer and the like in the traditional 14-mask design can be omitted by using a NMOS+Re-etch process and a novel touch wiring process in cooperation, so that the process can be simplified, and the material cost can be reduced.

In this embodiment, each pixel cell 15 in the horizontal direction of each touch cell 11 may correspond to three independent touch lines 12, which means that each touch line 12 may correspond to one sub-pixel 151 in each column.

In this embodiment, a number of the first touch lines 121 may be equal to a number of the touch cells 11 in the longitudinal direction of the touch cells 11 arrayed in the matrix manner, and a number of the second touch lines 122 may be equal to a difference between a number of the sub-pixels 151 in the horizontal direction of each touch cell 11 and a number of the first touch lines 121. It can be understood that the first touch lines 121 can be active touch lines and used to control the touch cells 11, while the second touch lines 122 can be virtual touch lines and used to cooperate with the first touch lines 121 to realize a uniform distribution of the touch lines 12 to the touch cells 11.

For instance, when a number of the touch cells 11 in the longitudinal direction is 48 and a number of the pixel cells 15 in the horizontal direction of each touch cell 11 is 40, the 40 pixel cells 15 can correspond to 120 touch lines 12, namely each sub-pixel 151 corresponds to one touch line 12, wherein the number of the first touch lines 121 is 48, and the number of the second touch lines 122 is 120−48=72. Wherein the first touch lines 121 and the second touch lines 122 can be distributed in such a manner that every two first touch lines 121 and three second touch lines 122 are repeatedly arrayed. For instance, one second touch line 122, one first touch line 121, one second touch line 122, one first touch line 121 and one second touch line 122 are alternately arrayed; or one first touch line 121, one second touch line 122, one first touch line 121, one second touch line 122 and one second touch line 122 are alternately arrayed; and as long as each pixel cell 15 corresponds to one first touch line 121, any configuration manner is permissible.

In other embodiments, the number of the first touch lines 121 may be equal to the number of the touch cells 11 in the longitudinal direction of the touch cells 11 arrayed in the matrix manner, and the number of the second touch lines 122 may be equal to a difference between a doubleness of the number of the pixel cells 15 in the horizontal direction of each touch cell 11 and the number of the first touch lines 121.

For instance, when the number of the touch cells 11 in the longitudinal direction is 48 and the number of the pixel cells 15 in the horizontal direction of each touch cell 11 is 40, 40 pixel cells 15 can correspond to 80 touch lines 12, that is to say, each pixel cell 15 corresponds to two touch lines 12, which means that every two touch lines 12 correspond to two sub-pixels 151 in each pixel cell 15, wherein the number of the first touch lines 121 is 48, and the number of the second touch lines 122 is 32. Wherein, the first touch lines 121 and the second touch lines 122 are distributed in such a manner that each pixel cell 15 corresponds to one first touch line 121 and one second touch line 122, or corresponds to two first touch lines 121.

In general, in actual applications, designers can adjust the number of the first touch lines 121 and the number of the second touch lines 122 according to the actual resolution requirements of the panels. Meanwhile, the designers can automatically set the distribution manner of the first touch lines 121 and the second touch lines 122 according to specific wiring requirements.

It should be appreciated for those skilled in this field that the configuration manner in FIG. 3 is only an illustrative one and is not intended to limit the present disclosure.

In this embodiment, the first control unit 13 and the second control unit 14 may be a touch display integrated chip, and the plurality of first control terminals 131 and the second control terminal 141 may be different touch terminals of the touch display integrated chip. Wherein, signals output by the different touch terminals may be Vcom signals with TP pulses, wherein the TP pulses are touch pulses, and Vcom refers to a common level. From a different perspective, the plurality of first control terminals 131 may be touch terminals, for common use, of the touch display integrated chip and may be used to provide normal touch signals for the first touch lines 121, and the second control terminal 141 may be a standby touch terminal of the corresponding touch display integrated chip and can be used to provide virtual touch signals for the second touch lines 122, so that the signals transmitted by the second touch lines 122 can be kept consistent with the signals transmitted by the first touch lines 121, and non-uniform display caused by signal differences can be avoided.

In other embodiments, the first control unit 13 may be a touch display integrated chip, and the plurality of first control terminals 131 may be different touch terminals in the touch display integrated chip. The second control unit 14 may be a power drive circuit, and the second control terminal 141 may be a voltage output terminal of the power drive circuit. Wherein the power drive circuit may be a DC-DC circuit, and the voltage output terminal of the power drive circuit can be used to output common level signals (namely Vcom signals). In this way, the common level signals transmitted by the second touch lines 122 may not need to pass through a fan-out area, and the number of lines in the fan-out area can be reduced, thus, reducing the risk in the manufacturing process and improving the reliability of products. Wherein, the fan-out area is used for arrangement of the first touch lines 121 between the first control unit 13 and the touch cells 11.

Figure 5:
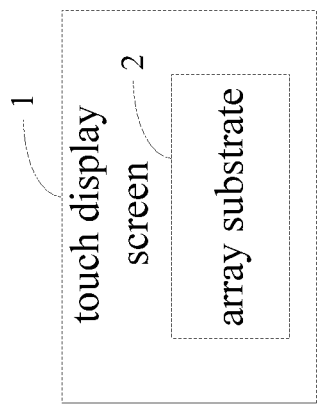
FIG. 5 is a schematic view of a touch display screen in one embodiment of the present disclosure.

FIG. 5 is a schematic view of a touch display screen in one embodiment of the present disclosure. As shown in FIG. 5, the touch display screen 1 may include an array substrate 2, wherein the array substrate 2 may be the array substrate 100 mentioned above.

The present disclosure has the following beneficial effects: the array substrate and touch display screen may include a plurality of touch cells arrayed in a matrix manner, a plurality of touch lines, a first control unit and a second control unit, wherein each touch cell may include a plurality of pixel cells arrayed in a matrix manner, and each pixel cell may include a plurality of sub-pixels; each touch line may be disposed in correspondence with a sub-pixel in a different column, part of the touch lines may be first touch lines, and the rest of the touch lines may be second touch lines; the first control unit may include a plurality of first control terminals, and each first control terminal may be electrically connected to a corresponding first touch line; and the second control unit may include a second control terminal, and the second control terminal can be electrically connected to the plurality of second touch lines. Through the plurality of added second touch lines, the problem that the touch lines cannot uniformly drive the touch cells in each column due to the fact that the number of the touch cells in the longitudinal direction is out of proportion with the number of the pixel cells in the horizontal direction in each touch cell can be solved.

The above description is only used to explain certain illustrative embodiments of the present disclosure, but is not intended to limit the patent scope of the present disclosure. All equivalent structures or equivalent flow transformations based on the contents in the specification and accompanying drawings of the present disclosure, or direct or indirect applications to other relevant technical fields should also fall within the patent protection scope of the present disclosure.

What is claimed is:

1. An array substrate, wherein the array substrate comprises:
   a plurality of touch cells arrayed in a matrix manner, wherein each touch cell comprises a plurality of pixel cells arrayed in a matrix manner, and each pixel cell comprises a plurality of sub-pixels;
   a plurality of touch lines, and each touch line disposed in correspondence with a sub-pixel in a different column, wherein part of the touch lines are first touch lines, and a rest of the touch lines are second touch lines;
   a first control unit, wherein the first control unit comprises a plurality of first control terminals, and each first control terminal is electrically connected to a corresponding first touch line;
   a second control unit, wherein the second control unit comprises a second control terminal, and the second control terminal is electrically connected to a plurality of second touch lines;
   wherein, the first touch lines and the second touch lines are located on a same metal layer;
   wherein, the array substrate further comprises a metal line closed and disposed outside an active area, and the metal line is electrically connected to the second control unit;
   wherein, each second touch line is in short connection with the metal line and then is electrically connected to the second control unit through the metal line;
   wherein a number of the first touch lines is equal to a number of the touch cells in a longitudinal direction of the touch cells arrayed in the matrix manner, and a number of the second touch lines is equal to a difference between a number of the sub-pixels in a horizontal direction of each touch cell and the number of the first touch lines, or equal to a difference between a doubleness of the pixel cells in a horizontal direction of each touch cell and the number of the first touch lines.

2. The array substrate according to claim 1, wherein the first touch lines, the second touch lines and a source/drain of the array substrate are located on a same layer.

3. An array substrate, wherein the array substrate comprises:
   a plurality of touch cells arrayed in a matrix manner, wherein each touch cell comprises a plurality of pixel cells arrayed in a matrix manner, and each pixel cell comprises a plurality of sub-pixels;
   a plurality of touch lines, and each touch line is disposed in correspondence with a sub-pixel in a different column, wherein part of the touch lines are first touch lines, and a rest of the touch lines are second touch lines;
   a first control unit, wherein the first control unit comprises a plurality of first control terminals, and each said first control terminal is electrically connected to a corresponding first touch line; and
   a second control unit, wherein the second control unit comprises a second control terminal, and the second control terminal is electrically connected to a plurality of second touch lines;
   wherein a number of the first touch lines is equal to a number of the touch cells in a longitudinal direction of the touch cells arrayed in the matrix manner, and a number of the second touch lines is equal to a difference between a number of the sub-pixels in a horizontal direction of each touch cell and the number of the first touch lines, or equal to a difference between a doubleness of the pixel cells in a horizontal direction of each touch cell and the number of the first touch lines.

4. The array substrate according to claim 3, wherein the first touch lines and the second touch lines are located on a same metal layer.

5. The array substrate according to claim 4, wherein the first touch lines, the second touch lines and a source/drain of the array substrate are located on a same layer.

6. The array substrate according to claim 3, wherein the array substrate further comprises a metal line closed and disposed outside an active area, and the metal line is electrically connected to the second control unit;
   wherein, each second touch line is in short connection with the metal line and then is electrically connected to the second control unit through the metal line.

7. The array substrate according to claim 6, wherein the plurality of second touch lines and the metal line are located on different metal layers, and each second touch line is in short connection with the metal line through a corresponding via hole.

8. The array substrate according to claim 3, wherein the first control unit and the second control unit is a touch display integrated chip, and the plurality of first control terminals and the second control terminal are different touch terminals of the touch display integrated chip.

9. The array substrate according to claim 3, wherein the first control unit is a touch display integrated chip, and the plurality of first control terminals are different touch terminals of the touch display integrated chip; and the second control unit is a power drive circuit, and the second control terminal is a voltage output terminal of the power drive circuit.

10. A touch display screen, wherein the touch display screen comprises an array substrate, and the array substrate comprises:
    a plurality of touch cells arrayed in a matrix manner, wherein each touch cell comprises a plurality of pixel cells arrayed in a matrix manner, and each pixel cell comprises a plurality of sub-pixels;
    a plurality of touch lines, and each touch line is disposed in correspondence with a sub-pixel in a different column, wherein part of the touch lines are first touch lines, and a rest of the touch lines are second touch lines;
    a first control unit, wherein the first control unit comprises a plurality of first control terminals, and each said first control terminal is electrically connected to a corresponding first touch line; and
    a second control unit, wherein the second control unit comprises a second control terminal, and the second control terminal is electrically connected to a plurality of second touch lines;
    wherein a number of the first touch lines is equal to a number of the touch cells in a longitudinal direction of the touch cells arrayed in the matrix manner, and a number of the second touch lines is equal to a difference between a number of the sub-pixels in a horizontal direction of each touch cell and the number of the first touch lines, or equal to a difference between a doubleness of the pixel cells in a horizontal direction of each touch cell and the number of the first touch lines.

11. The touch display screen according to claim 10, wherein the first touch lines and the second touch lines are located on a same metal layer.

12. The touch display screen according to claim 11, wherein the first touch lines, the second touch lines and a source/drain of the array substrate are located on a same layer.

13. The touch display screen according to claim 10, wherein the array substrate further comprises a metal line closed and disposed outside an active area, and the metal lines is electrically connected to the second control unit;
    wherein, each second touch line is in short connection with the metal line and then is electrically connected to the second control unit through the metal line.

14. The touch display screen according to claim 13, wherein the plurality of second touch lines and the metal line are located on different metal layers, and each second touch line is in short connection with the metal line through a corresponding via hole.

15. The touch display screen according to claim 10, wherein the first control unit and the second control unit is a touch display integrated chip, and the plurality of first control terminals and the second control terminal are different touch terminals of the touch display integrated chip.

16. The touch display screen according to claim 10, wherein the first control unit is a touch display integrated chip, and the plurality of first control terminals are different touch terminals of the touch display integrated chip; and the second control unit is a power drive circuit, and the second control terminal is a voltage output terminal of the power drive circuit.

* * * * *